(12) United States Patent
De Groot

(10) Patent No.: US 10,471,634 B2
(45) Date of Patent: *Nov. 12, 2019

(54) METHOD AND DEVICE FOR MANUFACTURING A SANDWICH STRUCTURE COMPRISING A THERMOPLASTIC FOAM LAYER

(71) Applicant: FITS HOLDING B.V., Driebergen (NL)

(72) Inventor: Martin Theodoor De Groot, Driebergen (NL)

(73) Assignee: FITS HOLDING B.V., Driebergen (NL)

( * ) Notice: Subject to any disclaimer, the term of this patent is extended or adjusted under 35 U.S.C. 154(b) by 537 days.

This patent is subject to a terminal disclaimer.

(21) Appl. No.: 15/032,380

(22) PCT Filed: Oct. 28, 2014

(86) PCT No.: PCT/NL2014/050741
§ 371 (c)(1),
(2) Date: Apr. 27, 2016

(87) PCT Pub. No.: WO2015/065175
PCT Pub. Date: May 7, 2015

(65) Prior Publication Data
US 2016/0250784 A1   Sep. 1, 2016

(30) Foreign Application Priority Data

Oct. 29, 2013  (NL) .................................... 1040475

(51) Int. Cl.
*B29C 44/00* (2006.01)
*B29C 44/30* (2006.01)
(Continued)

(52) U.S. Cl.
CPC ............ *B29C 44/00* (2013.01); *B29C 43/305* (2013.01); *B29C 44/10* (2013.01);
(Continued)

(58) Field of Classification Search
CPC .......... B29C 44/20; B29C 44/22; B29C 44/24; B29C 44/30; B29C 44/302; B29C 44/304;
(Continued)

(56) References Cited

U.S. PATENT DOCUMENTS 3,160,689 A   12/1964   Brunner
3,240,846 A    3/1966   Voelker
(Continued)

FOREIGN PATENT DOCUMENTS

CN   1467385 A   1/2004
EP   0636463 A1  2/1995
(Continued)

OTHER PUBLICATIONS

Lorric, "ABS material datasheet", Accessed Feb. 22, 2019 (Year: 2019).*

(Continued)

*Primary Examiner* — Seyed Masoud Malekzadeh
*Assistant Examiner* — Sonny V Nguyen
(74) *Attorney, Agent, or Firm* — Thomas|Horstemeyer, LLP

(57) ABSTRACT

A method and device for manufacturing a sandwich structure comprising at least one foam layer of a first thermoplastic comprising a chemical blowing agent and two cover layers. The decomposition temperature of the chemical blowing agent is higher than the melting point or range of the first thermoplastic. The method comprises a series of steps performed on an advancing starting structure including heating under pressure in order to cause decomposition of the blowing agent, intermediate cooling, foaming at a constant volume and further cooling.

19 Claims, 3 Drawing Sheets

(51) Int. Cl.
  *B29C 44/32* (2006.01)
  *B29C 44/58* (2006.01)
  *B29C 44/12* (2006.01)
  *B29C 44/34* (2006.01)
  *B32B 5/20* (2006.01)
  *B29C 44/46* (2006.01)
  *B29C 44/10* (2006.01)
  *B29C 43/30* (2006.01)
  *B32B 38/00* (2006.01)
  *B29K 101/12* (2006.01)
  *B29L 9/00* (2006.01)

(52) U.S. Cl.
  CPC .......... *B29C 44/1233* (2013.01); *B29C 44/30* (2013.01); *B29C 44/302* (2013.01); *B29C 44/326* (2013.01); *B29C 44/3415* (2013.01); *B29C 44/46* (2013.01); *B29C 44/586* (2013.01); *B32B 5/20* (2013.01); *B29C 44/304* (2013.01); *B29K 2101/12* (2013.01); *B29L 2009/00* (2013.01); *B32B 2038/0084* (2013.01); *B32B 2250/40* (2013.01)

(58) Field of Classification Search
  CPC ..... B29C 44/306; B29C 44/32; B29C 44/321; B29C 44/322; B29C 44/326; B29C 44/328; B29C 44/3403; B29C 44/3419; B29C 44/348; B29C 44/3484; B29C 44/3496; B29C 43/305; B29C 44/10; B29C 44/1233; B29C 44/46; B29C 44/50; B29C 44/586; B32B 5/20; B32B 2038/0084; B32B 2250/40
  See application file for complete search history.

(56) References Cited

U.S. PATENT DOCUMENTS

| | | | | |
|---|---|---|---|---|
| 3,818,085 | A * | 6/1974 | Marsland, Jr. | B29C 44/10 264/45.5 |
| 4,017,245 | A * | 4/1977 | Lang | B29C 44/467 264/45.5 |
| 4,976,902 | A * | 12/1990 | Oberle | B29C 44/00 264/320 |
| 5,562,791 | A * | 10/1996 | De Groot | B29C 44/1233 156/79 |
| 5,939,180 | A * | 8/1999 | Kobayashi | B29C 44/06 428/304.4 |
| 7,807,093 | B2 | 10/2010 | de Groot | |
| 8,110,133 | B2 | 2/2012 | de Groot | |
| 8,182,625 | B2 | 5/2012 | de Groot | |
| 8,426,006 | B2 | 4/2013 | de Groot | |
| 8,932,422 | B2 | 1/2015 | de Groot | |
| 9,242,425 | B2 | 1/2016 | de Groot | |
| 2007/0182047 | A1 * | 8/2007 | Henne | B29C 37/0032 264/45.1 |
| 2007/0265364 | A1 * | 11/2007 | Oner-Deliomanli | B29C 44/12 521/134 |
| 2009/0047463 | A1 | 2/2009 | de Grooi | |
| 2009/0115097 | A1 | 5/2009 | de Groot | |
| 2009/0297758 | A1 | 12/2009 | de Groot | |
| 2010/0215934 | A1 * | 8/2010 | Fabian Mariezkurrena | B29C 44/3446 428/220 |
| 2015/0118440 | A1 | 4/2015 | de Groot | |
| 2016/0271846 | A1 | 9/2016 | De Groot | |

FOREIGN PATENT DOCUMENTS

| | | | |
|---|---|---|---|
| EP | 1754585 A1 * | 2/2007 | .......... B29C 44/326 |
| EP | 1754585 A1 | 2/2007 | |
| FR | 1595012 A * | 6/1970 | ............ B29C 44/10 |
| FR | 1595012 A | 6/1970 | |
| GB | 626151 A * | 7/1949 | ........ B29C 44/3484 |
| GB | 701066 A | 12/1953 | |
| NL | 9200008 A | 8/1993 | |
| WO | 2008009395 A1 | 1/2008 | |
| WO | WO-2008009395 A1 * | 1/2008 | .............. C08J 9/103 |

OTHER PUBLICATIONS

Translation of FR 1595012 A, Translated Feb. 22, 2019, Espacenet.com (Year: 2019).*

International Search Report and Written Opinion of Application No. PCT/NL2014/050741 dated Jan. 28, 2015.

International Search Report for Chinese Application 2014800594648, dated Aug. 22, 2017, 2 pages.

* cited by examiner

METHOD AND DEVICE FOR MANUFACTURING A SANDWICH STRUCTURE COMPRISING A THERMOPLASTIC FOAM LAYER

CROSS-REFERENCE TO RELATED APPLICATIONS

This application is the National Stage of International Application No. PCT/NL2014/050741, filed 28 Oct. 2014, having the title "METHOD AND DEVICE FOR MANUFACTURING A SANDWICH STRUCTURE COMPRISING A THERMOPLASTIC FOAM LAYER" which claims the benefit of and priority to Netherlands Application No. 1040475, filed on 29 Oct. 2013, the contents of all of which are incorporated by reference as if fully set forth herein.

TECHNICAL FIELD

The present invention relates to a method and device for manufacturing a sandwich structure having a thermoplastic foam layer.

BACKGROUND

A generally known method for manufacturing a thermoplastic sandwich structure comprises extruding a thermoplastic foam layer and adhering it as a foam core between two fiber-reinforced thermoplastic cover layers, usually from the same thermoplastic as the foam layer. A drawback from this known method is that foaming of the core and adhesion thereof to the cover layers are separate steps, requiring strict process control and alignment.

EP-A-636 463 has disclosed a batch-wise method of producing a sandwich plate that consists of a foamed core layer and two fiber-reinforced cover layers. This known batch process comprises the steps of providing a sheet of a thermoplastic material, such as polyetherimide, containing an amount of a suitable solvent; placing said sheet between two fiber-reinforced layers of a similar thermoplastic material, such as polyetherimide; placing the core web and cover layer assembly between two pressure plates; supplying heat and pressure to the pressure plates to cause foaming of the core web and cooling the pressure plates when a predetermined foam layer thickness is obtained. In the examples foaming is performed at a temperature below Tg of polyetherimide containing dichloromethane as solvent functioning as a physical blowing agent. A drawback of this known batch wise process is the relatively slow production rate in particular for producing sandwich structures. Another drawback is that the solvent needs to be removed from the sandwich structure by drying, which is a time and energy consuming step adding to the costs.

GB 701 066 has disclosed a batchwise method of producing closed cell cellular bodies from thermoplastic masses, such as polyvinyl chloride by dissolving gases under high pressure in the mass in a closed press, followed by heating until the mass gelatinizes completely, then reducing the pressure and increasing the volume of the mass by ⅕-⅖ of the initial volume and thereafter cooling the mass, relieving the mass completely of pressure and freely expanding the mass. This method is not suitable for production of sandwich structures, because upon freely expanding the cover layers would tend to bulge and as a result these cover layers would not present a flat and smooth surface.

U.S. Pat. No. 3,160,689 has disclosed a method of batchwise producing a closed cell cellular body starting from a plastigel e.g. from polyvinyl chloride comprising softeners and/or solvents, and a latent blowing agent, kept in a putty-like consistency, preferably by the addition of stiffening gelling agents. This plastigel having the shape of the body to be made on a reduced scale, is placed in a pressure vessel under superatmospheric gaseous pressure and subjected to heating in order to decompose the latent blowing agent and gelatinize the plastigel. The gelatinized body is then cooled to a temperature below the gelatinization temperature while maintaining its plastic condition, whereafter pressure is relieved thereby expanding the body to a final shape without contacting the mould walls. In a preferred embodiment a limited expansion of the gas distributed in the shaped body is performed prior to cooling. Again this method is not suitable for production of sandwich structures, because the cover layers would bulge and not present a flat and smooth surface. Moreover an expansion in all directions of the body to be foamed cannot be applied to the reinforced cover layers.

Furthermore, the addition of the gelatinizing material reduces the mechanical properties of the foam and thus the compression/shear strength of the final foam. In a sandwich structure however, the mechanical performance of the foam is very important for the final mechanical performance of the sandwich structure. Thus gelatinizing material should be avoided. Also the presence of a substantial amount of solvents is detrimental for its application in a sandwich structure, because solvents have to be removed by a drying, e.g. in an oven, which is a time-consuming process as remaining solvent in the foam has to diffuse through the cover layers. Additionally, the incorporation of solids in the foam layer is undesirable for light-weight products.

SUMMARY

An object of the invention is to provide a manufacturing method of a sandwich structure having a thermoplastic foam layer, which does not show the above drawbacks, at least to a lesser extent.

A further object of the present invention is to provide a continuous manufacturing method of such sandwich structure, as well as to provide a device for carrying out such a method.

Another object of the invention is to provide a continuous manufacturing method of such a sandwich structure, wherein all steps thereof can be performed in one and the same press.

Accordingly the invention provides in a first aspect a method for manufacturing a sandwich structure, which sandwich structure comprises at least one foam layer of a first thermoplastic and two cover layers, the method comprising the steps of:

a) providing an advancing starting structure comprising at least one layer of a first thermoplastic having a melting temperature or melting range, and two cover layers; wherein the at least one layer of the first thermoplastic comprises a chemical blowing agent having a decomposition temperature above the melting temperature or melting range of the first thermoplastic;

b) heating the advancing starting structure to a temperature above the decomposition temperature of the chemical blowing agent so that decomposition of the chemical blowing agent occurs, thereby obtaining an advancing intermediate structure wherein the decomposed chemical blowing agent is present in the at least one layer of the first thermoplastic;

c) subsequent to the decomposition of the chemical blowing agent cooling of the advancing intermediate structure thus obtained; wherein said heating step b) and cooling step c) are carried out under pressure thereby preventing foaming of the at least one layer of the first thermoplastic d) during further advancing of the intermediate structure and at a temperature above the melting temperature or melting range of the first thermoplastic foaming of the at least one layer of thermoplastic comprising the decomposed chemical blowing agent of the intermediate structure, wherein the volume of the intermediate structure is made to increase and then kept constant thereby obtaining the sandwich structure, which structure comprises the at least one foam layer of the first thermoplastic and the two cover layers; and e) cooling of the advancing sandwich structure thus obtained.

In the method according to the invention a strip assembly comprising at least one layer of a first thermoplastic comprising a chemical blowing agent, which layer is positioned between two cover layers, is used as a moving starting structure (step a). In the context of this specification "strip" or "web" indicates a piece of material having a length considerably longer than a plate, e.g. several tens to hundreds of meters. The first thermoplastic has a melting point or range. The chemical blowing agent is selected such that its decomposition temperature is higher than the melting point or range of the first thermoplastic. In step b) while moving this starting structure is subjected to a heat treatment, in particular contact heating using heated press tools, which preferably move together with the advancing starting structure e.g. endless pressure belts, causing decomposition of the chemical blowing agent into gaseous decomposition products, like nitrogen, ammonia, oxygen, carbon monoxide and carbon dioxide. In order to perform the decomposition reaction at an appropriate rate for continuous mass production a temperature in the range of 15-60° C. above the decomposition temperature is preferred. The gaseous decomposition products are maintained in the at least one layer of the first thermoplastic in the intermediate structure, while the advancing structure is cooled, e.g. by enclosing the intermediate structure including the main surfaces as well as the lateral side faces, between the press tools. The intermediate structure is maintained under pressure thereby preventing the at least one layer of the first thermoplastic comprising the gaseous decomposition products of the chemical blowing agent from foaming. In the present specification the structure comprising at least one layer of first thermoplastic comprising gaseous decomposition products of the chemical blowing agent, that is not yet foamed, in between the two cover layers is called "an intermediate structure". Upon sufficient cooling (step c)) down to a temperature above the melting point or melting range of the first thermoplastic in the layer to be foamed, the volume of the advancing intermediate structure is allowed to increase in step d) to the final volume, in particular final thickness, of the sandwich structure to be made, by increasing the distance between the press tools of the press, thereby causing foaming of the at least one layer of the first thermoplastic through expansion of the gaseous decomposition products. The intermediate structure is allowed to foam in a single foaming step to a predetermined final volume during movement, usually only the thickness is increased. In this way a sandwich structured product is obtained that comprises at least one layer of the foamed first thermoplastic and at least two cover layers. Next in step e) the advancing sandwich web product thus obtained is allowed to cool while still pressurized and its volume is kept constant. Here it is noted that due to the difference between the operating temperature of step d and the final low temperature (typically ambient temperature) a temperature dependent volume reduction (shrinkage) may occur. At any rate, no further expansion occurs. It is advantageous to perform the cooling step at high cooling rate, at least to below the melting temperature of the first thermoplastic, allowing a fast solidification of the foam cells of the first thermoplastic. The final product produced as a "continuous" web of the sandwich product will be cut to size and further processed, such as packed and stored, or shaped, e.g. by deformation.

In the invention decomposition of the chemical blowing agent occurs not simultaneously in time with foaming of the at least one layer of first thermoplastic originally containing the chemical blowing agent and at a different temperature. According to the invention the decomposition temperature of the chemical blowing agent is higher than the melting temperature or melting range of the first thermoplastic. If these steps of decomposition and foaming were to be carried out simultaneously at the same temperature, then either this working temperature would be appropriate in view of decomposition rate but too high for forming adequate foam cells in the foam because the viscosity or melt strength of the first thermoplastic would be very low. If simultaneously carried out at an appropriate temperature in view of viscosity or melt strength of the first thermoplastic, then the decomposition rate would be slow and become a limiting factor in a continuous process. Decomposition of the chemical blowing agent at a high temperature, where the viscosity or melt strength of the molten first thermoplastic is low, also offers the advantage that the gaseous decomposition products are distributed well throughout the layer of the first thermoplastic. Extruded films of the first thermoplastic having a sufficient amount of chemical blowing agent are extruded just above the melting temperature or range of the thermoplastic in question and below the starting temperature of decomposing the chemical blowing agent. This starting temperature of decomposition of the chemical blowing agent is often within 10-20% of the melting temperature of the first thermoplastic. Thus efficient decomposition of the chemical blowing agent within tens of seconds may be performed at a temperature of 25-35% above the melting temperature or range of the first thermoplastic.

For example, commercially available (isotactic) propylene has a melting point (determined by differential scanning calorimetry) in the range of 160-171° C., depending on the amount of atactic PP present and crystallinity. Azodicarbonamide, depending on the particle size of the powder, generally starts to decompose above 175-185° C., while thermal decomposition in the invention is advantageously carried out at a considerably higher temperature as indicated above, such as above 200° C.

The selection of the materials for the at least one layer of first thermoplastic and the cover layers is inter alia dependent on the desired properties of the final product application.

Thermoplastics which are suitable for the layer to be foamed using a chemical blowing agent comprise both the crystalline and amorphous thermoplastics. Crystalline thermoplastics are preferred, as the difference between the glass transition temperature and melting point is small, offering the possibility of consolidating the thermoplastic once foamed within a small temperature interval. For mass production polyolefins like polyethylene, polypropylene are preferred examples.

As a material for the cover layers (also called skins or face sheets) thermoplastics, in particular fiber-reinforced thermoplastics, and metal sheets, e.g. aluminum, can be used. The bottom and top cover layers are preferably made from the same material, but combinations, e.g. a bottom cover layer of a metal like aluminum and a top cover layer of a (fiber-reinforced) thermoplastic are also contemplated.

The thermoplastics for the foam layer and the cover layers may be the same or different, including different grades. Hereinafter, for indication purposes the thermoplastic in a cover layer, if any, is referred to as second thermoplastic. Examples include polyolefins (obtained from C2-C4 monomers) like polypropylene (PP) and polyethylene (PE), polyamide (PA), polyethylene terephthalate (PET), poly carbonate (PC), polyetherimide (PEI), polyethersulfone (PES), polysulfone (PSU), polyphenylsulfone (PPSU), polyketone such as polyetheretherketone (PEEK), polyphenylene sulphide (PPS), liquid crystal polymers, polyvinylchloride (PVC), thermoplastic polyurethane (TPU), etc., as well as combinations thereof. Thermoplastic biopolymers are also contemplated.

In an advantageous embodiment at least one of the cover layers is a fiber-reinforced layer of a second thermoplastic. In a preferred embodiment both cover layers are fiber-reinforced layers of the second thermoplastic, in particular a fibrous layer impregnated with a thermoplastic. In case of thermoplastic fiber-reinforced cover layer(s) the cooling step c) prior to the foaming step d) prevents that due to the significantly lower force exerted by the press tools during foaming the thermoplastic fiber-reinforced cover layer(s) would be subjected to relaxation, in particular if the temperature would be high above the melting point or range of the second thermoplastic during foaming. Such a relaxation would affect the mechanical properties of the final product and also lower the surface appearance.

As indicated above, combinations of different thermoplastics for the first and second thermoplastics can also be used. Examples comprise, inter alia, polypropylene PP for the at least one foam layer covered with (fiber-reinforced) layers made from polyamide (PA), such as nylon, PEI for the at least one foam layer covered with (fiber-reinforced) cover layers made from PPSU, PS, PEEK or PC, PES or PPSU for the at least one foam layer covered with (fiber-reinforced) cover layers made from PSU (polysulfone) or PC. In an advantageous embodiment the nature of the first thermoplastic is equal to the nature of the second thermoplastic, but preferably of a different melt strength, as explained below.

In a further preferred embodiment the first thermoplastic of the at least one layer of thermoplastic that comprises a chemical blowing agent, has a melt strength higher than the melt strength of the second thermoplastic present in the cover layer at the operating temperature. This embodiment is particularly preferred where impregnation of one or more fibrous layers by the second thermoplastic in order to manufacture a fiber-reinforced cover layer of the second thermoplastics is part of the process, as will be explained later. Melt strength of a thermoplastic having a low melt strength can be adjusted, e.g. by adding a suitable amount of a compatible thermoplastic having a high melt strength into the first thermoplastic, incorporating nanoparticles, other melt strength improving agents, etcetera.

Other additives, like nucleating agents and plasticizers may also be present in the first thermoplastic layer.

Melt strength or melt tension is usually tested by pulling a molten polymer strand shaped in a capillary die through two counter rotating wheels, thereby elongating the strand with a defined velocity or acceleration until the strand breaks. Via a load cell on one of the rotating wheels the force is recorded. This test allows for a comparison of relative melt strength of different polymers.

Glass fibers are the preferred means of reinforcement. Other inorganic fibers, such as metal fibers, carbon fibers, and organic fibers such as aramide fibers, polymeric fibers, nano fibers of the aforementioned fibers and natural fibers can be used in the same manner, provided that they can withstand the temperature that they are subjected to during the operation of the method according to the invention. The fibers can be used in the form of mats, fabrics, chopped fibers and the like. Directional fibers, in particular unidirectional fibers, in which the fiber direction has been adapted to suit the intended use, can also be used advantageously. High strength, high elongation steel cords, may be present in the fiber reinforced cover layers. Another preferred embodiment for the starting structure is a mat made of both inorganic fibers and thermoplastic fibers, e.g. a mat manufactured from glass fibers and propylene fibers.

The chemical blowing agent is a compound that upon decomposition forms low molecular gases like nitrogen, carbon dioxide, carbon monoxide, oxygen, ammonia and the like. Examples of chemical blowing agents are: azobisisobutyronitrile, diazoaminobenzene, mononatriumcitrate and oxybis(p-benzenesulfonyl)hydrazide. Azo-, hydrazine and other nitrogen based chemical blowing agents are preferred. Azodicarbonamide is a preferred example of this category. Other examples include isocyanate for PU and sodium bicarbonate.

A layer of the first thermoplastic comprising a chemical blowing agent can be easily manufactured, e.g. by extrusion or calendaring. An extruded film of the first thermoplastic also comprising the chemical blowing agent, is a preferred embodiment.

The starting structure is assembled in a way such that the at least one layer of the first thermoplastic comprising the chemical blowing agent to be decomposed is arranged between two cover layers. Thus the most simple construction of the assembly is a 3-layered structure, however, 5-layered, 7-layered and so on can likewise be used. In addition, where there is more than one layer of the first thermoplastic comprising a chemical blowing agent, a further reinforcing layer, e.g. a thin metal film or high strength, high elongation steel cords, reinforcing fibers that may be impregnated, can be present between two layers of the first thermoplastic comprising a chemical blowing agent. In an embodiment a cover layer comprises fibrous layer impregnated with a thermoplastic. A starting layout for the cover layer may also comprise a fibrous layer inbetween films of a thermoplastic. During the process of the invention the fibrous layer is impregnated by the thermoplastic.

In a preferred embodiment in step a) the starting structure is obtained by providing a web assembly of at least one layer of a first thermoplastic comprising a chemical blowing agent, at one face thereof a layer or layers comprising reinforcing fibers, such as a fibrous mat, and the second thermoplastic, e.g. in the form of powder or fibers, and at the other face a cover layer, which may have a different or the same structure, wherein the assembly is subjected in step b) to a heating treatment during a period of time sufficient for melting and impregnating the second thermoplastic into the layer comprising reinforcing fibers. The fibrous layer may also comprise a combination of fibers including thermoplastic fibers of the second thermoplastic. Upon heating to the melting point or range the thermoplastic fibers will melt and form the matrix (second thermoplastic) of the fiber-reinforced layer. The same applies, when the second thermoplastic is present as a particulate material, e.g. powder, in the fibrous layer.

In another preferred embodiment in step a) the starting structure is obtained by providing a web assembly, e.g. as a stack of layers, comprising at least one layer of a first thermoplastic comprising a chemical blowing agent, and at one face thereof a fiber-reinforcement layer, and a layer of a second thermoplastic, and at the other face a cover layer of a different type, or of the same structure i.e. a fiber-reinforcement layer and a further layer of the second thermoplastic, the assembly being subjected in step b) to a heating treatment during a period of time sufficient for obtaining a fiber-reinforced layer impregnated by the second thermoplastic. In a more preferred embodiment thereof the starting structure is such an assembly, wherein in-between the at least one layer of a first thermoplastic comprising a chemical blowing agent and the fiber-reinforcement layer another layer of the second thermoplastic is positioned. This embodiment is particularly preferred as impregnation, decomposition, intermediate cooling and then foaming and final cooling can be performed in one and the same line of operations.

In another advantageous embodiment, in step a) the starting structure is obtained by providing an assembly comprising at least one layer of a first thermoplastic having a first melt strength comprising a chemical blowing agent, and at both faces thereof a layer of a second thermoplastic having a second melt strength lower than said first melt strength, a fiber layer, and a further layer of the second thermoplastic having the second melt strength, which assembly is subjected to a heating treatment in step b) during a period of time sufficient for impregnating the fiber layers with the second thermoplastic having the second melt strength.

In these embodiments the heating treatment in step b) for decomposing the chemical blowing agent is extended in time ensuring simultaneous impregnation of the fiber layers with the molten second thermoplastic.

It is contemplated that the one or two layers of the second thermoplastic could already have been applied to the fiber-reinforcement layer and partially impregnated therein thereby obtaining a subassembly that is used in the starting structure. In these embodiments impregnation by melting the second thermoplastic, subsequent decomposition of the chemical blowing agent, intermediate cooling and then foaming of the first thermoplastic, followed by final cooling are performed as a series of steps in one and the same continuous line of operations and preferably using one and the same press device.

In an advantageous embodiment in the foaming stage (step d)) of the process according to the invention once a uniform temperature has been reached the volume increase is a non-linear increase, determined by the thermoplastic material, the chemical blowing agent and its decomposition products and the desired thickness of the foamed core in the final product.

In an advantageous embodiment of the invention steps b)-e) are carried out in the same press between endless belts, moving together with the advancing starting structure, intermediate structure and sandwich structure obtained. During operation the advancing structure obtained in step a) passes from the press entry to the press exit subsequently through at least a heating zone (step b), a cooling zone (step c), a foaming zone (step d) and a final cooling zone (step e).

In an advantageous embodiment for carrying out the method according to the invention in a continuous manner, in step a) the starting structure is obtained by continuously unwinding the at least one layer of the first thermoplastic comprising a chemical blowing agent, preferably an extruded film as explained above, and continuously unwinding the two cover layers, and combining thereof to a web assembly of at least one layer of the first thermoplastic comprising a chemical blowing agent, and the two cover layers. Optionally the individual layers may be preheated. This is particularly useful if relative thick cover layers are used.

According to a further aspect the invention also relates to a device for continuously manufacturing of a thermoplastic sandwich structure, which structure comprises at least one foam layer of a first thermoplastic and two cover layers, in particular for performing the continuous mode of operation of the method according to the invention as explained above, which device comprises:

a first endless belt and a second endless belt both driven by a drive and that are adapted for advancing under pressure the thermoplastic sandwich structure, an intermediate structure and/or starting structure thereof between the belts, which belts are mutually spaced apart at a first predetermined distance in a feed section, wherein the feed section is provided with heating means for heating the starting structure as well as cooling means for cooling the intermediate structure positioned downstream of the heating means, wherein in a transition section the distance between the first and second endless belts increases from the first predetermined distance to a second fixed distance greater than said first predetermined distance, optionally the transition section comprising heating means and/or cooling means for maintaining the intermediate structure at the foaming temperature, and in a discharge section the first and second belts are maintained at the second fixed distance, and the discharge section comprises cooling means for cooling the thermoplastic sandwich structure.

BRIEF DESCRIPTION OF THE DRAWINGS

The invention is further illustrated by means of the attached drawing, wherein.

DETAILED DESCRIPTION

Figure 1:
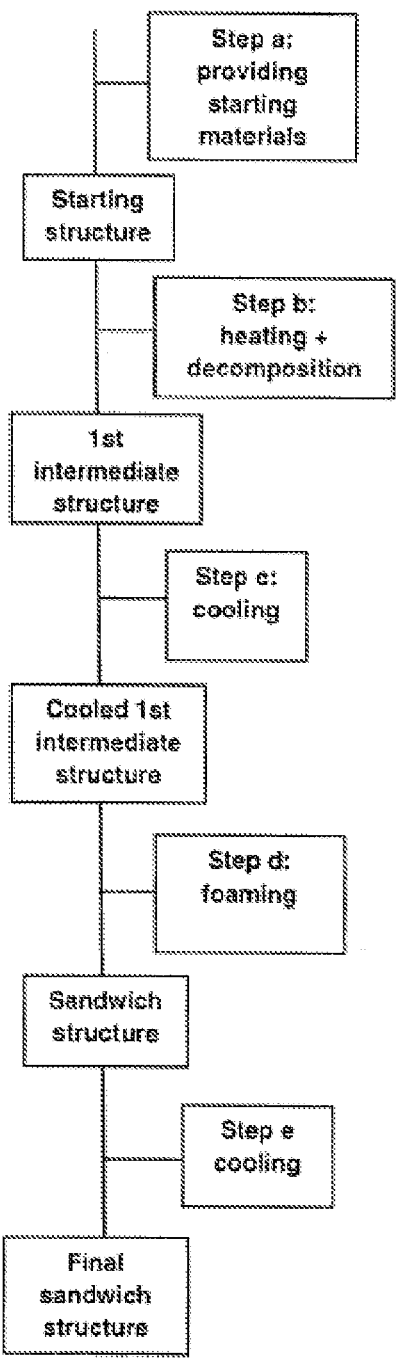
FIG. 1 is a process diagram of the various steps of an embodiment of the method according to the invention.

FIG. 1 shows the general outline of a process of continuously manufacturing a thermoplastic sandwich structure according to the invention. In step a) starting materials are provided, which may be carried out in various ways as explained above. The result of step a) is a moving starting structure—in its most simple layout—having a central layer of a first thermoplastic material wherein a chemical blowing agent is incorporated. On top of and below the central layer of the first thermoplastic comprising the chemical blowing agent a cover layer, such as a fiber-reinforcing layer e.g. a mat or fabric, impregnated with a second thermoplastic material as matrix is present. In step b) the starting material, while moving in the heating zone, is subjected to a heat treatment above the decomposition temperature of the chemical blowing agent thereby producing gaseous decomposition products in the central layer of the first thermoplastic material. Usually at a temperature of about 20-40° C. above the decomposition temperature the decomposition process is completed in one to several tens of seconds, e.g. 15 seconds. During step b) the starting material is subjected to pressure in a press having the press tools at a fixed first distance thereby keeping the volume (mainly height or thickness) essentially constant in order to prevent premature foaming. The result of step b) is a moving intermediate structure comprising in this case the central layer comprising the gaseous decomposition products of the chemical blowing agent and on both main surfaces thereof the cover layers. While maintaining pressure, in step c) the advancing intermediate structure is cooled to a temperature above the melt temperature or range, usually a few degrees Celsius such as 1-15° C. above the melt temperature or upper limit of the melt temperature range of the first thermoplastic in the cooling zone downstream of the heating zone. If the cover layer(s) comprise(s) also a second thermoplastic, then this second thermoplastic may already be at least partially solidified, which is beneficial for the appearance of the cover layer(s) comprising the second thermoplastic. The transition zone of solidified thermoplastic may also include the area of the first thermoplastic adjacent the cover layers of the second thermoplastic. This will depend inter alia on the cooling rate, the cooling capacity of the press tools, thickness and nature of the cover layers. Preferably this area will be as small as possible. The result of step c) is a cooled intermediate product. Upon attaining this temperature step d) is initiated in the downstream foaming zone by relieving the pressure in a controlled way by increasing the distance between the press tools to a second distance value. Due to this pressure relief the gaseous decomposition products in the central layer expand and form the cells of the foam layer of the first thermoplastic. Due to the kind of pressure relief the resulting foam cells have an elongated shape in the thickness direction. See also FIGS. 2 and 3. During this step d) additional heat may be supplied as needed to maintain the temperature of the intermediate structure above the melt temperature of the first thermoplastic of the central layer. Step d) can suitably performed within tens of seconds, e.g. about 15-30 seconds, for a foam thickness of up to 25 mm. When a predetermined thickness of the sandwich structure is obtained, the distance between the press tools will be maintained at the fixed second distance and the obtained sandwich structure comprising a foamed central layer and having bonded thereto at both main surfaces a cover layer. Then in step e) the thus obtained sandwich structure while moving is cooled down in the final cooling zone to a temperature below the melt temperature or range of the first thermoplastic and if any second thermoplastic, usually down to ambient temperature while the volume is kept constant by maintaining the press tools at said second fixed distance thereby preventing continuation of the foaming process and accompanying increase in thickness of the central foamed layer. The resulting product is a final sandwich structure having a foamed central layer of the first thermoplastic in between two cover layers, that are bonded to the central layer. The sandwich structure thus obtained can be subjected to further processing steps like cutting to (standard) sheet dimensions, shaping into 3D objects and the like.

Figure 2:
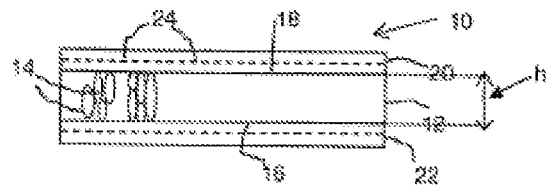
FIG. 2 shows a first embodiment of a thermoplastic sandwich structure.

FIG. 2 shows a first 3-layered embodiment of a sandwich structure in cross section made according to the method of the invention. The sandwich structure is indicated in its entirety by reference numeral 10 and comprises a center layer 12 of a foamed first thermoplastic having elongated cells 14 in the height direction h (thickness) meaning that the major axis of the cells 14 extends in the height direction. At both main surfaces 16 and 18 respectively, the center layer 12 of foamed first thermoplastic is bonded to cover layers, in this case outer fiber-reinforced layers 20 and 22 of a second thermoplastic respectively. In the drawing the fiber-reinforcement is indicated by broken line 24. It will be understood that in a multi-layered sandwich structure having more than 3 layers, such as a 5- or 7-layered structure the fiber-reinforcing layers and the foam layers are arranged in an alternating manner, with the proviso that the outermost layer on both main faces is a fiber-reinforced layer of thermoplastic like layers 20 and 22.

In the figures to be described parts similar to those of FIG. 2 are indicated by the same reference numerals, where deemed convenient in terms of clarity provided with a suffix.

Figure 3:
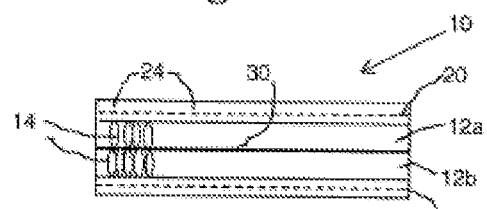
FIG. 3 shows another embodiment of a thermoplastic sandwich structure.
Figure 4:
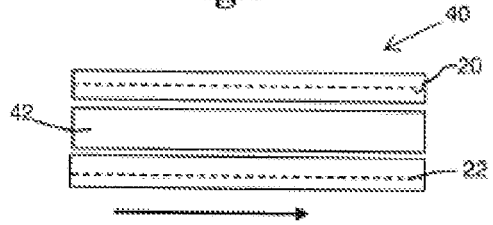
FIG. 4 is a first embodiment of a starting structure.

FIG. 3 shows a 4-layered embodiment of a sandwich structure 10 in cross section made according to the method of the invention. In this embodiment the structure 10 comprises a center layer 30 of a reinforcement such as a thin metal film like aluminum, a fabric which may be impregnated, or high strength steel cords, having foamed layers 12a, 12b of a first thermoplastic bonded to the top and bottom faces thereof. In turn, the foamed first thermoplastic layers 12a, 12b are bonded to fiber-reinforced layers 20, 22 of second thermoplastic FIG. 4 shows a first embodiment of a starting structure in cross section to which the process according to the invention can be applied. The advancing (indicated by arrow) starting structure 40 comprises outer fiber-reinforced layers 20 and 22 of a second thermoplastic pre-impregnated in the fiber-reinforcement 24 as a matrix, between which a layer 42 of a first thermoplastic containing a chemical blowing agent is arranged. Upon using the method according to the invention with this starting structure, decomposing the chemical blowing agent, foaming of the first thermoplastic in layer 42 after cooling the intermediate structure occur in one continuous process.

Figure 5:
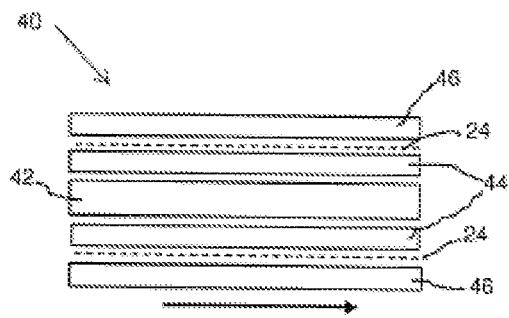
FIG. 5 is a second embodiment of a starting structure.

FIG. 5 shows a second embodiment of an advancing (indicated by arrow) starting structure 40. In this case the layer 42 of first thermoplastic containing a chemical blowing agent is positioned between two layers 44 of a second thermoplastic. On top of each layer 44 a bare (not-impregnated) fiber-reinforcement 24 such as a glass fiber mat is positioned, which on its turn is covered by a further layer 46 of the second thermoplastic. Upon subjecting this starting structure to the method according to the invention, impregnation of the fiber-reinforcement 24 by the second thermoplastic originating from the layers 44 and 46, decomposition of the chemical blowing agent, subsequent foaming of the first thermoplastic in layer 42, while bonding occurs, are incorporated in one process operated in one press.

Figure 6:
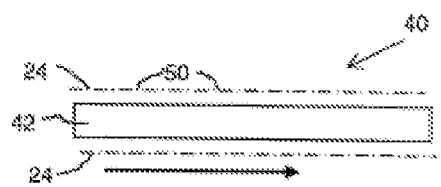
FIG. 6 is a third embodiment of a starting structure.

FIG. 6 shows a third embodiment of an advancing (indicated by arrow) starting structure 40. In this embodiment the layer 42 of the first thermoplastic is between two fiber-reinforcement layers 24. In each fiber-reinforcement layer 24 the second thermoplastic is present as a powder indicated by dots 50, which has not formed a matrix yet. Upon subjecting this starting structure to the process according to the invention, forming the matrix of the second thermoplastic in the fiber-reinforcement 24 thereby forming a fiber-reinforced cover layer of the second thermoplastic, decomposing the chemical blowing agent, foaming of the first thermoplastic to a foamed core and bonding are performed in one process and in one press.

In another embodiment the dots 50 represent thermoplastic fibers, e.g. the fiber-reinforcement as a whole comprises a blend of glass fibers 24 and fibers 50 of a second thermoplastic. Again upon using the process according to the invention the thermoplastic fibers 50 will melt and form a matrix of the second thermoplastic wherein the fibers 24 are present. Thus impregnating, forming a matrix, decomposing, cooling, foaming and bonding take place.

Figure 7:
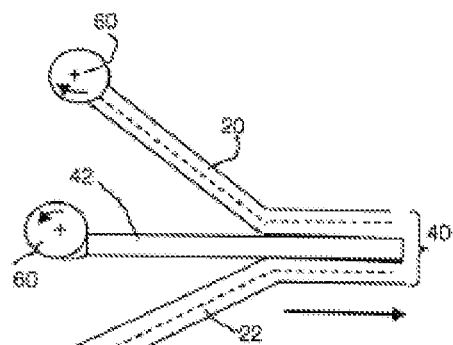
FIG. 7 is a fourth embodiment of a starting structure.
Figure 8:
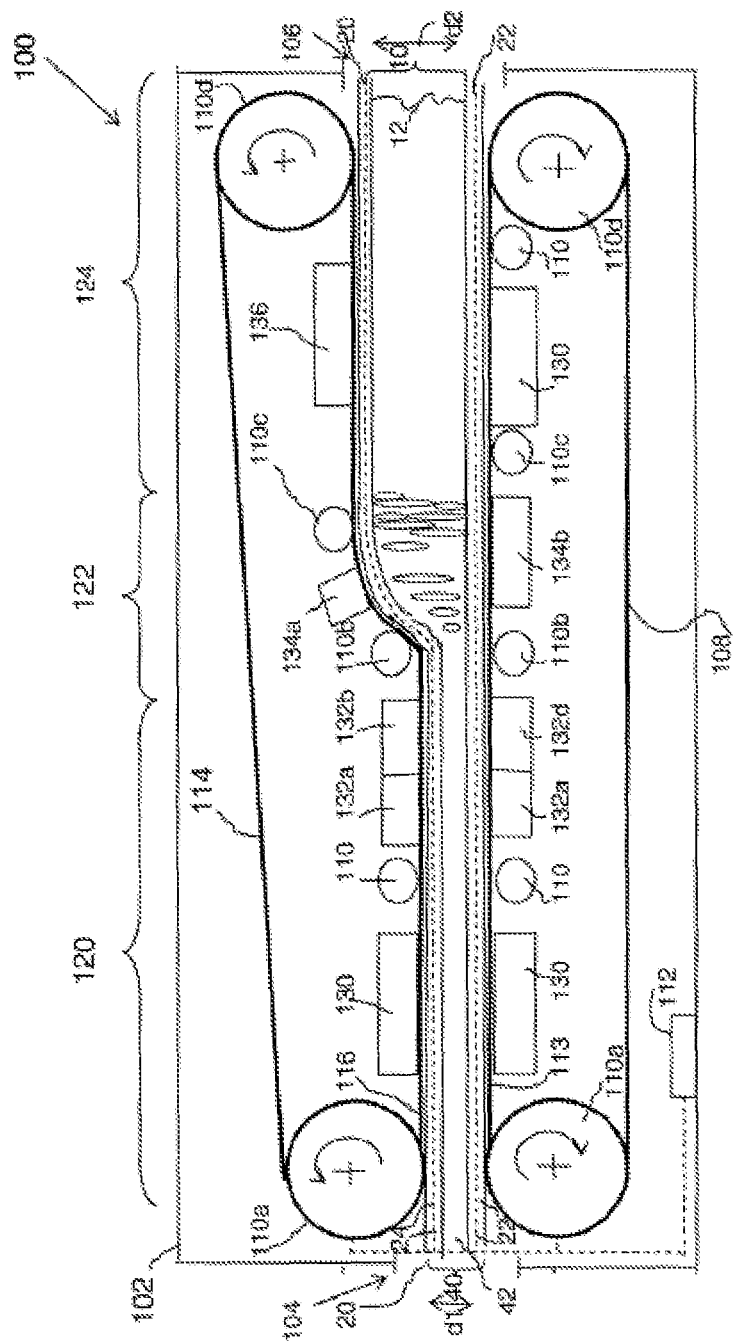
FIG. 8 shows an embodiment of a device according to the invention.

FIG. 7 represents an embodiment similar to that of FIG. 4, where the various layers 42, 20 and 22 are arranged on top of each other as a layered stack. This fig. also shows that the various layer are continuously unwound from coils 60. Continuous having the meaning of a considerable length (not endless) of thermoplastic sandwich structure. FIG. 8 shows a basic design of a device 100 of continuously manufacturing a thermoplastic sandwich structure according to the invention. The device 100 or belt press comprises a housing 102 having an entry 104 for feeding a thermoplastic starting structure 40, in this case similar to the embodiment of FIG. 4, and an exit 106 for discharging a sandwich structure 10, similar to that shown in FIG. 2. Within the housing 100 from entry 104 to exit 106 a lower endless belt 108 e.g. from metal sheet, guided over rolls 110 at least one of which is driven by a drive 112, is arranged. The upper part 113 of belt 108 forms a straight horizontal surface. Similarly an upper endless belt 114 guided over rolls 110 at least one of which is driven by drive 112 or a separate one, is arranged spaced apart from the lower endless belt 108. Together the simultaneously driven upper part 113 of belt 108 and the lower part 116 of upper belt 114 define a gap, by means of which the starting structure 40 moves from the entry 104 to exit 106 while being processed according to the invention. Examples of suitable belt materials include amongst others metal, fiber-reinforced Teflon etcetera. As shown, in a feed section 120 between the guide rolls 110a and 110b the upper part 113 of belt 108 and the lower part 116 of belt 114 are arranged at a fixed first distance d1, thus defining a fixed volume. In a subsequent transition section 122 between rolls 110b and 110c the lower part 116 of belt 114 is directed upwards, thereby increasing the distance between the upper part 113 and lower part 116 to a fixed second distance d2. The curvature of the lower part 116 of belt 114 may be applied using magnets, small guiding rolls, spring equipped shoes having a predetermined surface along which the belt part is guided, and edge guiding rails or profiles. In the discharge section 124 between rolls 110c and 110d again the belts 108 and 114 remain at the second predetermined distance d2. From the discharge section 124 the cooled thermoplastic sandwich structure 10 leaves the device 100 through the exit 106. In the feed section 120 a heating means 130 for heating the starting structure 40 is provided (heating zone), preferably the heating means 130 heat the respective lower part 116 of belt 114 and the upper part 113 of belt 108 locally. In a downstream (cooling) zone still in the feed section 120 upstream of rolls 100b a cooling means 132 for cooling the first intermediate structure is provided. Again the cooling means 132 comprise multiple parts 132a-d for cooling the belt parts 113 and 116 respectively. In the transition section 122 (foaming zone) a further heating means 134 comprising parts 134a and 134b are present, if necessary enabling maintenance of the temperature above the melt temperature of the first thermoplastic during foaming. Optionally the transition section comprises also cooling means (not separately shown) in order to control the temperature in the transition section. In the discharge section 124 one or more cooling means 136 for cooling the structure below the melting temperature of the first (and if present second) thermoplastic(s) are arranged.

Preferably the various zones are thermally isolated from one another.

The invention claimed is:

1. A method for manufacturing a sandwich structure, the sandwich structure comprising at least one foam layer of a first thermoplastic and two cover layers, the method comprising the steps of:
   a) providing an advancing starting structure comprising at least one layer of a first thermoplastic having a melting temperature or melting range, and two cover layers; wherein the at least one layer of the first thermoplastic comprises a chemical blowing agent having a decomposition temperature above the melting temperature or melting range of the first thermoplastic;
   b) heating the advancing starting structure to a temperature above the decomposition temperature of the chemical blowing agent so that decomposition of the chemical blowing agent occurs, thereby obtaining an advancing intermediate structure wherein the decomposed chemical blowing agent is present in the at least one layer of the first thermoplastic;
   c) subsequent to the decomposition of the chemical blowing agent, cooling of the advancing intermediate structure; wherein said heating step b) and cooling step c) are carried out under pressure while the advancing starting structure and the advancing intermediate structure are advanced in a press having press tools thereby preventing foaming of the at least one layer of the first thermoplastic
   d) during further advancing of the intermediate structure the at least one layer of thermoplastic comprising the decomposed chemical blowing agent of the intermediate structure is foamed at a temperature above the melting temperature or melting range of the first thermoplastic, wherein the volume of the intermediate structure is made to increase by increasing the distance between the press tools of the press and then kept constant thereby obtaining the sandwich structure, wherein the sandwich structure comprises the at least one foam layer of the first thermoplastic and the two cover layers; and
   e) cooling of the advancing sandwich structure under pressure.

2. The method according to claim 1, wherein in step a) the starting structure is obtained by continuous unwinding the at least one layer of the first thermoplastic comprising the chemical blowing agent, and continuous unwinding the two cover layers, and combining thereof to an assembly of the at least one layer of the first thermoplastic comprising the chemical blowing agent, and the two cover layers.

3. The method according to claim 2, wherein the at least one layer of the first thermoplastic comprising the chemical blowing agent is an extruded film.

4. The method according to claim 3, wherein steps b)-e) are performed in the press between endless moving belts thereof.

5. The method according to claim 2, wherein steps b)-e) are performed in the press between endless moving belts thereof.

6. The method according to claim 2, wherein in step b) the advancing starting structure is heated to a temperature that is 25-35% above the melting temperature or range of the first thermoplastic, or the advancing starting structure is heated to a temperature that is in the range of 15-60° C. above the decomposition temperature of the chemical blowing agent.

7. The method according to claim 1, wherein the at least one layer of the first thermoplastic comprising the chemical blowing agent is an extruded film.

8. The method according to claim 7, wherein steps b)-e) are performed in the press between endless moving belts thereof.

9. The method according to claim 1, wherein steps b)-e) are performed in the press between endless moving belts thereof.

10. The method according to claim 1, wherein in step b) the advancing starting structure is heated to a temperature that is 25-35% above the melting temperature or range of the first thermoplastic, or the advancing starting structure is heated to a temperature that is in the range of 15-60° C. above the decomposition temperature of the chemical blowing agent, or both.

11. The method according to claim 1, wherein at least one of the cover layers of the starting structure is a fiber-reinforced cover layer of a second thermoplastic.

12. The method according to claim 11, wherein a material property of the second thermoplastic is equal to a material property of the first thermoplastic.

13. The method according to claim 11, wherein the first thermoplastic has a higher melting strength than the second thermoplastic.

14. The method according to claim 11, wherein at least one of the cover layers of the starting structure is a layer of fibres impregnated with the second thermoplastic.

15. The method according to claim 1, wherein the first thermoplastic is a crystalline thermoplastic.

16. The method according to claim 1, wherein the starting structure comprises the at least one layer of the first thermoplastic comprising the chemical blowing agent, and at least two fiber-reinforced layers of the second thermoplastic, such that the outermost layers are fiber-reinforced layers of a second thermoplastic.

17. The method according to claim 1, wherein in step a) the advancing structure is obtained by providing a web assembly of the at least one layer of the first thermoplastic comprising the chemical blowing agent, at one face thereof at least one layer comprising reinforcing fibers and a second thermoplastic, and at the other face a cover layer, wherein the assembly is subjected in step b) to the heating during a period of time sufficient for melting and impregnating the second thermoplastic into the layer comprising reinforcing fibers.

18. The method according to claim 1, wherein in step a) the starting structure is obtained by providing a web assembly comprising at least one layer of a first thermoplastic comprising a chemical blowing agent, and at one face thereof a fiber-reinforcement layer, and a layer of a second thermoplastic, and at the other face a cover layer, wherein the assembly is subjected in step b) to a heating treatment during a period of time sufficient for melting and impregnating the layer of the second thermoplastic into the layer comprising reinforcing fibers.

19. The method according to claim 1, wherein in step d) the volume increase is non-linear in time.

* * * * *